July 18, 1961 L. DEVOL 2,993,159
MOTOR
Filed Oct. 30, 1958
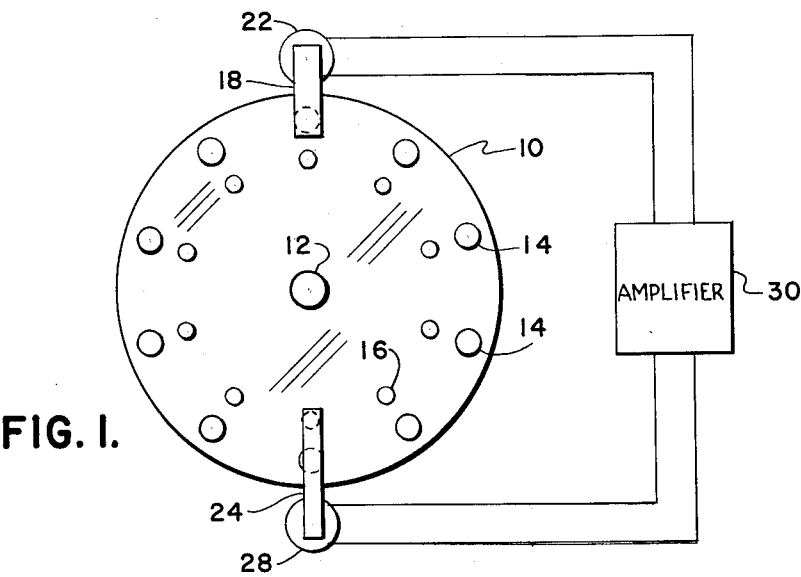
FIG. I.
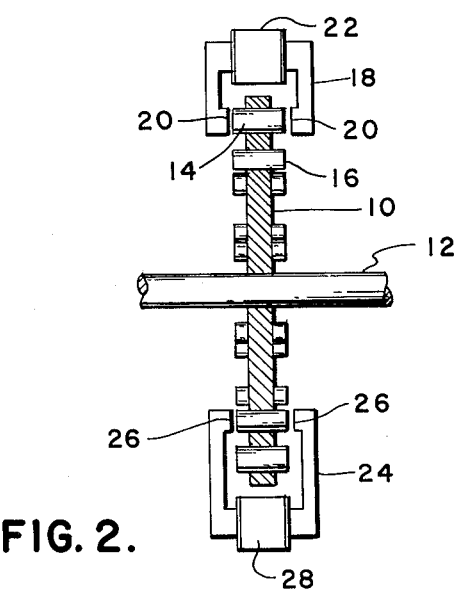
FIG. 2.
INVENTOR
*Lee Devol*
BY *Diggins & Le Blanc*
ATTORNEYS

# United States Patent Office 2,993,159
Patented July 18, 1961

2,993,159
MOTOR

Lee Devol, Dayton, Ohio, assignor to Hamilton Watch Company, Lancaster, Pa., a corporation of Pennsylvania
Filed Oct. 30, 1958, Ser. No. 770,854
3 Claims. (Cl. 318—254)

This invention relates to motors and more particularly relates to electric impulse motors.

In assignee's copending application Serial No. 770,846, filed October 30, 1958, there is disclosed an electric impulse motor which is controlled by a mechanical vibrator and which is suitable for driving a watch, clock or other timepiece. The instant invention relates to an impulse motor which may be used when a constant and accurate rotation is not necessary and operates without a mechanical vibrator as a speed control element. The motor may be stalled without drawing excessive power and without damaging the motor windings. Because of this characteristic the motor is particularly well suited to certain applications, such as winding watch or clock springs.

It is a primary object of the invention to provide an improved magnetic impulse motor.

It is a further object of the invention to provide an improved magnetic impulse motor which is simple in construction, low in cost and capable of operation from a battery source of power.

It is another object of the invention to provide an impulse motor which may be operated from a battery source and which may be stalled without drawing excessive power from such source and without damaging the motor windings.

These and further objects and advantages of the invention will become more apparent upon reference to the following specification and claims and appended drawings wherein:

FIGURE 1 is a plan view of an impulse motor constructed according to the invention; and FIGURE 2 is a vertical elevation partly in section showing the impulse motor of FIGURE 1.

Referring to the figures of the drawing, the impulse motor of the invention consists of a non-magnetic disc 10 mounted upon a shaft 12 which is journaled in suitable bearings, not shown. Mounted at equidistant points about the periphery of the disc 10 is a first circle of cylindrical permanent magnets 14. A second circle of smaller cylindrical permanent magnets 16 is also peripherally mounted concentrically within and radially aligned with the magnets 14. A first C-shaped core 18 is mounted at the top of the disc and has poles 20 terminating immediately adjacent the path of movement of the circle of magnets 14. The core 18 carries a coil 22.

A second C-shaped core 24 is mounted at the bottom of the disc and has poles 26 immediately adjacent the paths of movement of the inner circle of magnets 16. A coil 28 is provided on the core 24.

According to the invention the coil 22 on the first C-shaped core 18 is connected to the input of an amplifier 30, while the output of this amplifier is connected to the coil 28 on the core 24. The amplifier may be of any suitable type such as, for instance, a transistor amplifier of the type disclosed in assignee's aforementioned copending application. The load circuit of such an amplifier is normally biased to a non-conducting condition but is rendered conducting when the input of the amplifier receives an impulse from the coil 22 as one of the magnets 14 passes between the poles 20 of core 18.

In operation the amplifier receives such impulses from the coil 22 as the magnets 14 pass between the poles 20 of the core 18 and this produces surges of power to the coil 28 of a proper polarity to repulse the adjacent magnet 16 in the inner circle of magnets and thus drive the disc. A certain adjustment in the speed of the motor is obtained by shifting the position of the lower C-shaped keeper to the left or right along the circle of rotation of the inner magnets 16.

A motor of this type requires relatively little power, can be operated from batteries, and is capable of stalling without drawing excessive power from the source or damaging the motor itself. It will be appreciated that when the motor is stalled there is no movement between coils and magnets and thus the transistor or equivalent element in the amplifier is in an "off" condition. This latter characteristic renders the motor satisfactory for such applications as winding watches or clocks without damaging the main spring of the watch or clock and without drawing excessive power from the amplifier or overheating the coils in the motor. The unit is capable of operating from a limited source of battery power and thus may be provided in a minature form.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An impulse motor comprising a rotor formed of non-magnetic material and carrying two groups of permanent magnets, said groups being arranged concentrically at different radial distances completely around the axis of rotation of said rotor, stator means mounted in proximity to the paths of movement of said permanent magnets, said stator means including first magnetic means forming an air gap through which one of said groups of permanent magnets pass and second magnetic means forming another air gap through which the other of said groups of permanent magnets pass, amplifier means, a first coil coupling said first magnetic means to the input of said amplifier, and a second coil coupling said second magnetic means to the output of said amplifier, whereby said first coil supplies impulses to the input of said amplifier where they are amplified and supplied to said second coil to drive said rotor.

2. An impulse motor as set out in claim 1 wherein said second magnetic means is movable circumferentially of said rotor to alter the speed thereof.

3. An impulse motor as set out in claim 2 wherein each of said groups consists of ten permanent magnets spaced equal angular distances about said axis adjacent the outer edge of said rotor.

References Cited in the file of this patent

UNITED STATES PATENTS 2,719,944  Brailsford _____ Oct. 4, 1955
2,877,399  Shaull _____ Mar. 10, 1959

FOREIGN PATENTS 746,465  Great Britain _____ Mar. 14, 1956